United States Patent

Joseph

Patent Number: 5,968,671
Date of Patent: Oct. 19, 1999

[54] BRAZED COMPOSITES

[76] Inventor: Brian E. Joseph, 18 Lynwood Ave., Wheeling, W. Va. 26003

[21] Appl. No.: 08/961,680

[22] Filed: Oct. 31, 1997

[51] Int. Cl.[6] .............................. B32B 15/14; B32B 5/02
[52] U.S. Cl. ......................... 428/611; 428/614; 428/654
[58] Field of Search ................................... 428/608, 614, 428/654, 611

[56] References Cited

U.S. PATENT DOCUMENTS

| | | | |
|---|---|---|---|
| 3,615,277 | 10/1971 | Kreider et al. | 29/195 |
| 3,795,042 | 3/1974 | Kreider et al. | 29/472.3 |
| 3,900,150 | 8/1975 | Delgrosso et al. | 228/185 |
| 3,984,043 | 10/1976 | Kreider et al. | 228/190 |
| 4,010,884 | 3/1977 | Rothman | 228/190 |
| 4,110,505 | 8/1978 | Prewo | 428/114 |
| 4,762,268 | 8/1988 | Doble | 228/186 |
| 4,886,202 | 12/1989 | Ammon | 228/120 |
| 4,907,736 | 3/1990 | Doble | 228/190 |
| 5,286,560 | 2/1994 | Fishkis et al. | 428/357 |
| 5,410,133 | 4/1995 | Matsen et al. | 219/645 |
| 5,562,245 | 10/1996 | Berthelemy et al. | 228/190 |
| 5,720,246 | 2/1998 | Griffen et al. | 123/90.62 |

Primary Examiner—John J. Zimmerman

[57] ABSTRACT

A composite material made of continuous aluminum oxide fibers reinforcing an aluminum matrix to form a strand where the strands are formed into a structure and brazed together in a vacuum using an aluminum brazing alloy. The brazing alloy is preferably an aluminum silicon alloy.

In winding filament wound vessels, an electric current may be used to heat the strands to cause a coating of the aluminum brazing alloy to melt.

6 Claims, 2 Drawing Sheets

BRAZED COMPOSITES

BACKGROUND

This invention relates to composite materials. Composite materials have found application in numerous industries such as pressure vessels, aircraft skins, crane booms, bicycle frames, tennis rackets, golf clubs and the like.

Materials used in space systems have traditionally been common aerospace materials with the majority of structural and mechanical components being constructed of aluminum alloys. Materials that have been used for specific applications require properties which cannot be met by aluminum have included magnesium, steel and titanium. Polymer composites are finding a growing acceptance in space systems due to their tailorability and relative ease of fabrication for complex parts, and their improved performance in the harsh environments of space.

Continuous-fiber metal matrix composites have been successfully applied in space systems, notably the space shuttle tube truss structure of boron/aluminum composite.

Current limitations to the application of metal matrix composites relate mainly to the difficult and expensive fabrication processes that are involved in producing even the simplest metal matrix composite part or components.

The most common useage of composite materials are for boats, and other recreational vehicles and are increasingly used in advanced car designs.

SUMMARY OF THE INVENTION

The present invention is directed to the brazing of continuous alumina fiber reinforced aluminum matrix strand, which aluminum is in a pure form, by the use of an aluminum brazing alloy. The brazing alloy has a lower melting temperature than the aluminum matrix. The brazing alloy joins the alumina reinforced aluminum strands to each other or to other strands. More specifically, the composite includes elongated pure aluminum strands reinforced by aluminum oxide fibers extending for the length of the strand which are joined with other similar strands that are either parallel to or adjacent one another with the joinder between the strands made by an aluminum brazing material which joins said strands to each other.

The objects and advantages will become apparent from the following description of preferred embodiments thereof, when taken in conjunction with the drawings, wherein like reference numerals refer to corresponding parts in the several views.

DRAWINGS

DESCRIPTION OF THE PREFERRED EMBODIMENT

Figure 1:
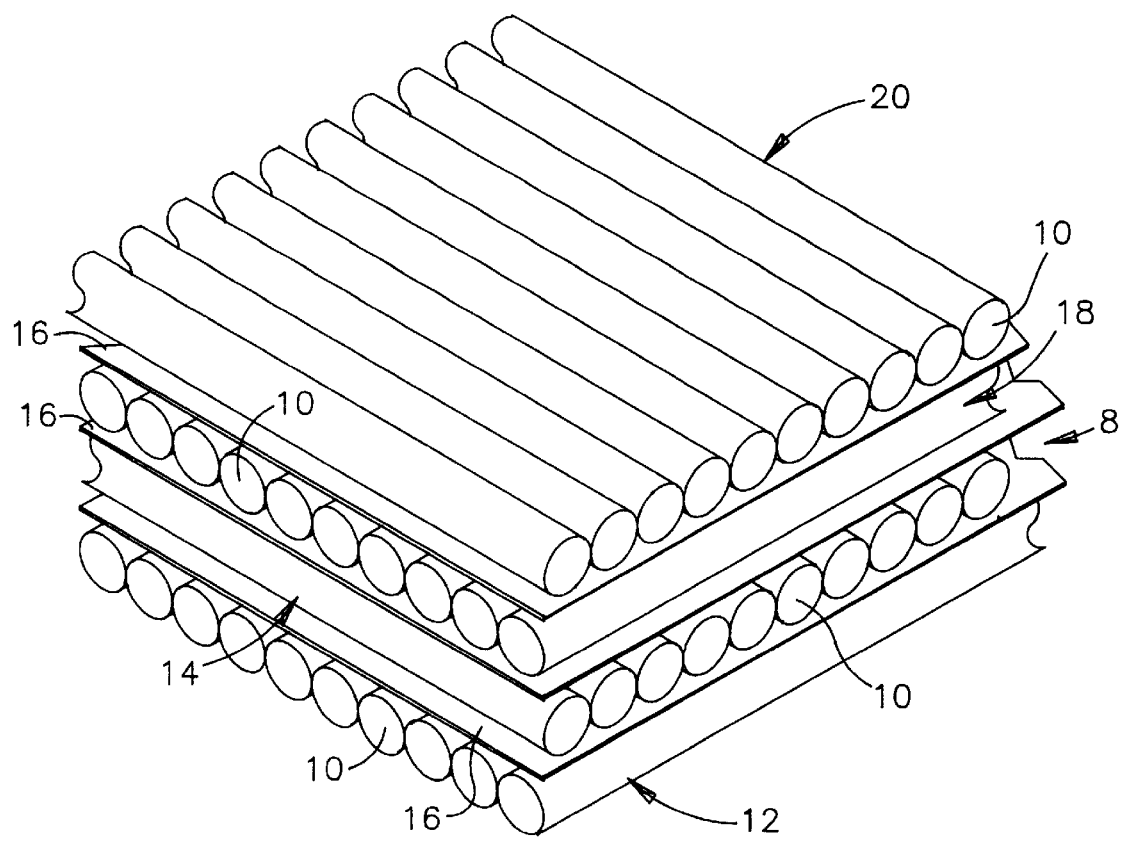
FIG. 1 shows a composite of elongated aluminum strands reinforced by aluminum oxide fibers arranged in touching parallel rows with an aluminum brazing sheet between the rows.

With reference to FIG. 1 there is shown a layup 8 of alumina fiber reinforced aluminum strands 10 lying parallel to one another in a first row 12 with a second row 14 of similar strands placed at 90 degrees to said first row or some other appropriate angle with a brazing sheet 16 for aluminum placed there between. Additional rows 18 and 20 can be stacked on top of the first two rows to provide a structure with an aluminum brazing sheet 16 between the additional rows.

Figure 2:
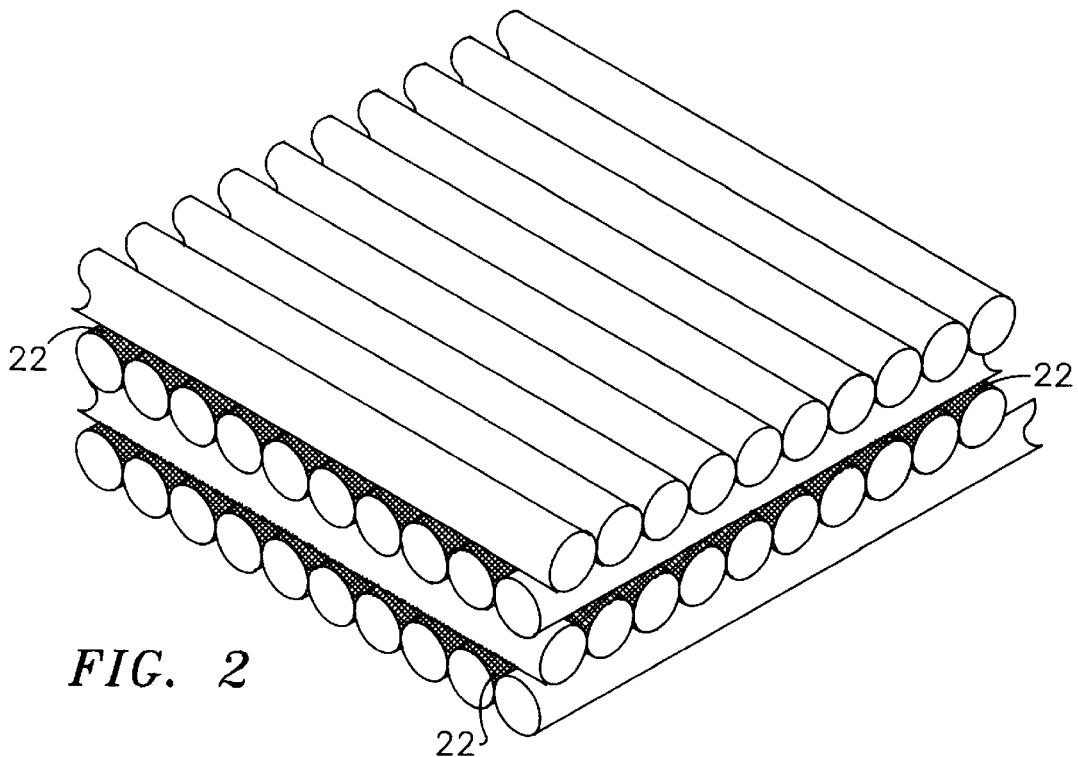
FIG. 2 is a view similar to FIG. 1 in which the components of FIG. 1 have been brazed together.

With reference to FIG. 2, after the layup 8 of FIG. 1 has been brazed, interstices 22 are filled with melted then solidified brazing material to join together all of the strands by the aluminum braze alloy.

This arrangement is best illustrated by the following example.

EXAMPLE

I. Overview

Aluminum oxide (alumina) fiber reinforced aluminum strands were brazed together with aluminum brazing sheet in a vacuum furnace. The strands were layered in a criss-cross pattern with brazing sheets between the layers. Strength in both longitudinal and transverse directions becomes very great if arranged in this manner.

II. Materials

The strand utilized consisted of $Al_2O_3$ Nextel 610 fibers embedded in very pure 10xx aluminum. The brazing material is an important key to success in this operation. This 4xxx aluminum aloy contains a high percentage (10 to 11%) of silicon. The silicon decreases the melting point close to the eutectic point (1070 deg. F.) . This insures that the braze sheet melts but the pure aluminum does not melt. For proper vacuum brazing, approximately 1% magnesium is added as the other major alloy. 4104 aluminum alloy (9.8% Si, 1.5% Mg and the remainder primarily aluminum) was utilized for this brazing operation.

III. Procedure

A. Preparation

1. Cleaning

The strands were first wiped with acetone soaked swabs and then soaked in three consecutive baths of 1—1—1 Trichloroethane. The brazing sheet was lightly cleaned with Scotch-Brite (Trademark) to remove any oxidation and then cleaned in the same manner as the strands.

2. Fixturing

Twenty strands of 2 mm diameter were cut to equal lengths. Four brazing sheets were cut equal to the wire length and as wide as 10 wires (20 mm). Two lengths of 0.012 inch nickel wire were laid down to form an "X" on a clean surface. Brazing sheet was laid over the nickel wire covering the X diagonally. Ten strands were then laid directly over the braze sheet and another braze sheet was laid on top. The first three layers were all oriented in the same direction. Ten strands were then laid down with a braze sheet on top. These strands were oriented transverse to the first layers. Although only two directions of strands were necessary for strength, this pattern may be repeated as many times as desired. Finally, the nickel wires were pulled around the layers diagonally to form an X on top and were twisted tightly.

B. Brazing

The strand fixture was placed into a vacuum furnace laying horizontally on a stainless steel rack. It was left under high vacuum over night to achieve the proper vacuum and cleanliness. A 24 minute vacuum brazing furnace cycle was started. A final brazing temperature of 1115 degrees F. was attained and held for 3 minutes at a vacuum pressure no greater than 3.0 E–5 Torr. The sample fixture was then removed from the furnace and cooled. The nickel wire was then removed and the resulting composite was cut diagonally for inspection.

IV. Results

Metallography of the braze joint showed that the strands were surrounded with the brazing sheet material. There was a definite metallurgical bond with no porosity or gaps between the strands.

Brazing of aluminum is a well known technology and usually involves an aluminum alloy chosen to have a lower melting point than pure aluminum and usually is used with a flux to assist in the joining. The flux removal is generally a problem so it preferred that the brazing actually be done in a vacuum furnace which does not require the flux or alternatively the brazing may be done in a furnace that has a controlled atmosphere.

Figure 3:
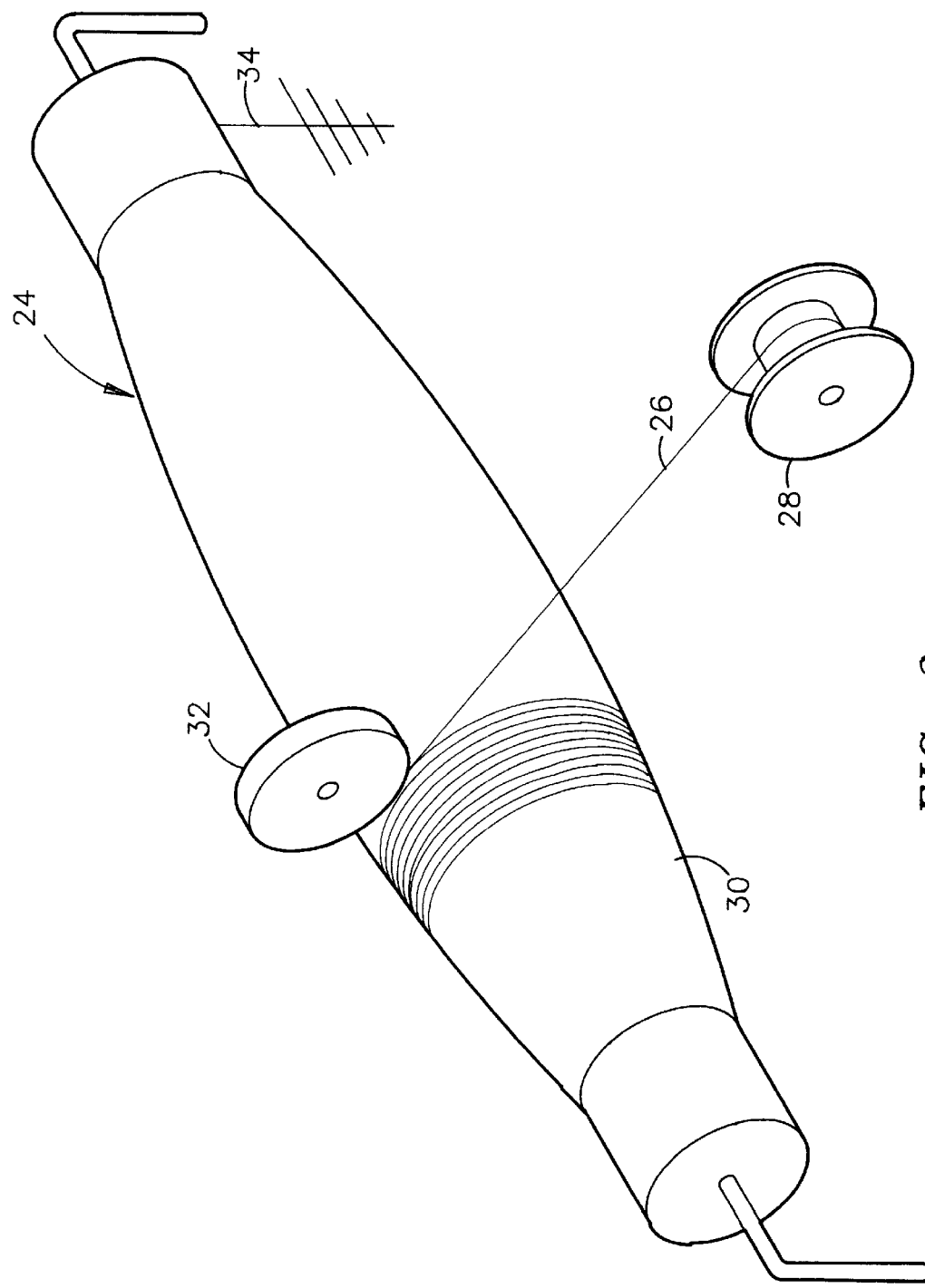
FIG. 3 is a schematic of the use of the composite material of this invention being filament wound onto a mandrel with electricity being passed through the strand as it is wound to cause the energy to melt the brazing aloy and to braze the material together.

With reference to FIG. 3 there is shown schematically a traditional filament winding apparatus 24 upon which the alumina fiber reinforced aluminum strand 26 is fed from a reel 28 onto a rotating mandrel of the shape desired which in this case could be a pressure vessel and especially one for liquid oxygen. As the strands are laid down on the mandrel they may be brazed by electricity being conducted from an electrically conducting roller 22 through the strand 26 to the mandrel which is grounded at 34. The strand 26 has a previously applied thin coating of a low melting point aluminum brazing alloy. As the wire is placed upon the mandrel 24 electricity flows from the conductor wheel 32 to the mandrel 24 through the strand 26 and to the heating the braze alloy until it melts and brazes the strand 26 to the adjoining strands. This is not the only way of heating the filament wound strands as they can also be heated with a laser that follows the winding process. Alternatively, the wound part can be entirely laid up by the filament winding technique with the strands being previously coated with a flux and brazing alloy and laid down onto the rotating mandrel. When layer after layer has been laid down until a final part is complete the part is either heated in an oven or placed in an autoclave to braze the composite part.

Both the ceramic fibers which are continuous strands of alumina ceramic fibers and the aluminum matrix strands reinforced with the continuous strand alumina ceramic fibers to produce a composite of a pure aluminum matrix and alumina fibers are available from the 3M Corporation, 3M Center, St. Paul, Minn. 55144-1000. The alumina continuous strands of ceramic fibers are designed to provide a very high performance-to-cost ratio that determines their use and commercial applications. 3M sells these fibers under the trademark Nextel. Nextel 610 has a high purity, fine grain alumina with high strength (400 KSI) and stiffness (55 Msi). This fiber is the highest performance, tow based aluminum oxide fiber commercially available. While other fibers such as silicon carbide and boron have been used in the past to reinforce alloys such as aluminum, the high cost of the reinforcing fiber prohibited broad commercial applications. Specific characteristics of the Nextel 610 are set forth in the following:

| Nextel 610 Technical Data | |
| --- | --- |
| Composition | >99% $Al_2O_3$ |
| Tensile Strength (1" length) | 375–400 ksi (2.6 GPa–2.8 GPA) |
| Modulus of Elasticity | 55 Msi (385 GPa) |
| Density | 3.9 g/cm$^3$ (.14 lb/in$^3$) |
| Diameter | 12 $\mu$m |
| Filaments per Tow | 420, 780 |
| Average CTE | $7.1 \times 10^{-6}$ °C$^{-1}$ |

When the continuous ceramic fiber such as Nextel 610 is incorporated into a pure aluminum matrix to form a continuous ceramic fiber aluminum matrix composite, the strands so produced are excellent structural materials that can be used in a wide range of weight critical, high-performance applications. The composite offers outstanding improvements in mechanical properties over particulate or whisker-reinforced aluminum, and unreinforced structural materials such as aluminimum, titanium and steel, both at room and elevated temperatures.

These strands can have different characteristics based on controlling the interface between the ceramic fiber and surrounding matrix and two such strands are the 3M CF-AMC 100 which is especially designed for such applications as bending, compression, or stiffness.

When the use is for applications requiring high tensile strength or fatigue strength, the 3M CF-AMC 200 is preferred. The technical data for both composite strands are included below.

| 3M CF-AMC 100 Technical Data Typical properties of unidirectional composites with 50 volume percent fiber | |
| --- | --- |
| Moduli | |
| Tensile modulus, 0° | 33 Msi (228 GPa) |
| Tensile modulus, 90° | 20 Msi (140 GPa) |
| Shear modulus, 0° | 6.9 Msi (48 GPa) |
| Shear modulus, 90° | 6.5 Msi (45 GPa) |
| Strength | |
| Tensile strength, 0° | 90 ksi (620 MPa) |
| Tensile strength, 90° | 40 ksi (280 MPa) |
| Shear strength, 0° | 30 ksi (200 MPa) |
| Shear strength, 90° | 38 ksi (260 MPa) |
| Compressive strength, 0° | 550 ksi (3800 MPa) |
| Compressive strength, 90° | 90 ksi (620 MPa) |
| Fatigue-Axial, 0° | |
| Endurance limit (10$^6$ cycles) | 45 ksi (310 MPa) |
| | R = 0.1 |
| Density | 0.116 lb/in$^3$ (3.22 g/cm$^3$) |
| Average CTE, 0° RT-400° C. | $9.3 \times 10^{-6}$ °C$^{-1}$ |
| (RT-750° F.) | ($5.2 \times 10^{-6}$ °F$^{-1}$) |

| 3M CF-AMC 200 Technical Data Typical properties of unidirectional composites with 40 volume percent fiber | |
| --- | --- |
| Moduli | |
| Tensile modulus, 0° | 27 Msi (190 GPa) |
| Tensile modulus, 90° | 12 Msi (80 GPa) |
| Shear modulus, 0° | 7 Msi (47 GPa) |
| Shear modulus, 90° | 6 Msi (42 GPa) |
| Strength | |
| Tensiie strength, 0° | 160 ksi (1100 MPa) |
| Tensile strength, 90° | 6 ksi (40 MPa) |
| Shear strength, 0° | 18 ksi (120 MPa) |
| Shear strength, 90° | 38 ksi (260 MPa) |

-continued

| | |
|---|---|
| Compressive strength, 0° Fatigue-Axial, 0° | 380 ksi (2600 MPa) |
| Endurance limit ($10^6$ cycles) | 140 ksi (970 MPa) R = 0.1 |

Common features of the composite strands before brazing include low density, strength and stiffness retention beyond 300 degrees C. (572 degrees F.), good vibrational damping, excellent wear resistance, non-magnetic characteristics, good corrosion resistance, low thermal conductivity, and reduced thermal expansion.

The brazed aluminum oxide fiber reinforced aluminum strands when formed with this invention provides a number of unique applications. One such application is for tankage for liquid oxygen. The development of a light weight liquid oxygen tank is important for the future commercialization of space. Currently the X-33 and X-34 development engineers would prefer a better technology than is currently available. With the technology of this invention, there is provided a better strenth to weight ratio and more lightning proof protection since the tankage conducts electricity and permits a more ready grounding. This latter characteristic is important for rockets and airplanes.

The term brazing as used in connection with this invention refers to the use of a metal brazing material for adjoining the alumina fiber reinforced aluminum matrix strands to one another. Brazing is usually at a lower temperature than traditional welding where the material of the strand is caused to melt to help form the joining structure and brazing is usually above the very low melting temperature soldering applications. However, as brazing is used herein it embraces joining the strands of continuous alumina fiber reinforced aluminum where the brazing occurs below any significant melting of the strands at the high end but above the very low melting temperature solders that are usually used in ordinary joining of electrical circuits.

The alumina fiber reinforced aluminum strands utilized in this invention consists of alpha aluminum oxide fibers in a matrix of commercially pure aluminum. The aluminum oxide fibers used are manufactured exclusively by 3M and sold under the trademark Nextel 610 (Trademark). This fiber is specifically designed for use in metal matrix composite strands-it has an average diameter of 12 microns, and an average tensile strength of 450,000 pounds/square-inch. The material can also be manufactured as tapes or various other forms.

The aluminum matrix composite strand typically contains between 40% and 50% fiber by volume, although higher fiber volumes are possible. The fibers run continuously along the length of the strand. Typical tensile strength is 200,000 pounds/square-inch. The longitudinal stiffness is 29 Msi with a relatively low density of 3.2 g/cm. The strand has more than double the specific stiffness and strength of aluminum, titanium and steel alloys. The coefficient of thermal expansion of the strand is less than half that of these materials. The specific stiffness and strength are comparable to polymer composites, but without the environmental concerns that must be dealt with in using polymers in the harsh environments of launch and space.

This material is well suited to be made into complex shapes by such processes as filament winding, hand layup, and automated layup machines. The joining of strands such as wire or tapes may be accomplished by the use of an aluminum brazing alloy coated on the strands.

Brazing of these strands into parts may be accomplished as a continuous or batch process in either a vacuum or controlled atmosphere environment. The process of this invention provides extremely flexible manufacturing options, with a high strength, high stiffness material.

The ability to produce components with the same manufacturing techniques used to produce other components (i.e., filament winding and hand lay-up) increases the design flexibility and decreases the manufacturing costs of the brazed metal matrix composite products.

The brazed aluminum wire composite material may be used in numerous military and commercial rocket propulsion, aircraft and aerospace applications in addition to liquid oxygen tanks, and other pressure vessels; honeycomb aircraft skins; hoop stiffeners; structural members for aircraft, etc. As mentioned earlier, commercial and consumer applications include crane booms and sports/recreational equipment such as: tennis rackets, golf club shafts, bicycle frames, etc.

The present invention can be utilized for making net-shape parts of three-dimentional structures such as automotive components, structural inserts for selectively reinforcing larger aluminum castings and for use in other applications where equivalent performance with similar weight savings may be involved.

The above description and illustrations should not be construed as limiting the scope of the invention, which is defined by the appended claims.

What is claimed is:

1. A compound composite structure comprising:

a first composite structure of elongated aluminum matrix strand reinforced by tow based aluminum oxide fibers extending the length thereof;

a compound composite where said first composite structure is either a first composite structure that is wound over itself or adjacent to another similar first composite structure or a combination of said first composite structures that are wound and said first composite structure that is adjacent another similar first composite structure; and said compound composite further including a brazing metal between said first composite structures to form a compound composite having a structure compounded into a compound composite.

2. The compound composite structure of claim 1 wherein said aluminum matrix strand has said fibers of at least 5% by volume to 80% by volume of said aluminum matrix strand.

3. The compound composite structure of claim 1 wherein said aluminum is substantially pure aluminum.

4. The compound composite structure of claim 3 wherein said brazing aluminum alloy having a melting temperature less than the melting point of pure aluminum.

5. The compound composite structure of claim 1 wherein a hollow shape is provided by winding said strand into said shape and brazing said strand after being wound.

6. The compound composite structure of claim 1 wherein said brazing metal is vacuum joined to said strands.

* * * * *